United States Patent [19]

Muranaga et al.

[11] Patent Number: 4,851,896
[45] Date of Patent: Jul. 25, 1989

[54] MANUAL SWEEPING APPARATUS

[75] Inventors: Yoshinobu Muranaga; Takashi Sato, both of Tokyo, Japan

[73] Assignee: Casio Computer Co., Ltd., Tokyo, Japan

[21] Appl. No.: 88,857

[22] Filed: Aug. 24, 1987

[30] Foreign Application Priority Data

Aug. 29, 1986 [JP] Japan ............................ 61-132305[U]
Sep. 17, 1986 [JP] Japan ................................ 61-218451

[51] Int. Cl.⁴ ........................ H04N 1/04; H04N 1/10; H04N 1/21
[52] U.S. Cl. .................................... 358/443; 358/474; 358/296
[58] Field of Search ............... 358/256, 293, 285, 280, 358/296, 294

[56] References Cited

U.S. PATENT DOCUMENTS

| | | |
|---|---|---|
| 3,541,248 | 11/1970 | Young . |
| 3,767,020 | 10/1973 | Rowe . |
| 4,523,235 | 6/1985 | Rajchman . |
| 4,574,317 | 3/1986 | Scheible ............................. 358/285 |
| 4,611,246 | 9/1986 | Nihei . |
| 4,639,790 | 1/1987 | Kusaka ................................ 358/293 |
| 4,701,804 | 10/1987 | Toyoda ............................... 358/280 |
| 4,717,965 | 1/1988 | Mashiko .............................. 358/285 |
| 4,742,559 | 5/1988 | Fujiwara ............................. 382/59 |
| 4,750,049 | 6/1988 | Murakami ........................... 358/296 |

FOREIGN PATENT DOCUMENTS 55-115773 9/1980 Japan .

Primary Examiner—E. A. Goldberg
Assistant Examiner—Scott A. Rogers
Attorney, Agent, or Firm—Frishauf, Holtz, Goodman & Woodward

[57] ABSTRACT

A manual sweeping apparatus having a housing, an image sensor, a printer, and a memory. As the housing is manually swept across an original, while keeping the housing in contact with the original, information read by the image sensor is written into the memory. Thereafter, as the housing is manually moved across a piece of recording paper, while keeping the housing in contact with the paper, the information is read out from the memory and subsequently printed on the paper. During the data-reading operation, the apparatus detects and indicates whether or not any unwritten memory area exists in the memory. During the data-printing operation, the apparatus detects said indicates whether or not any items of data to be printed are stored in the memory.

5 Claims, 8 Drawing Sheets

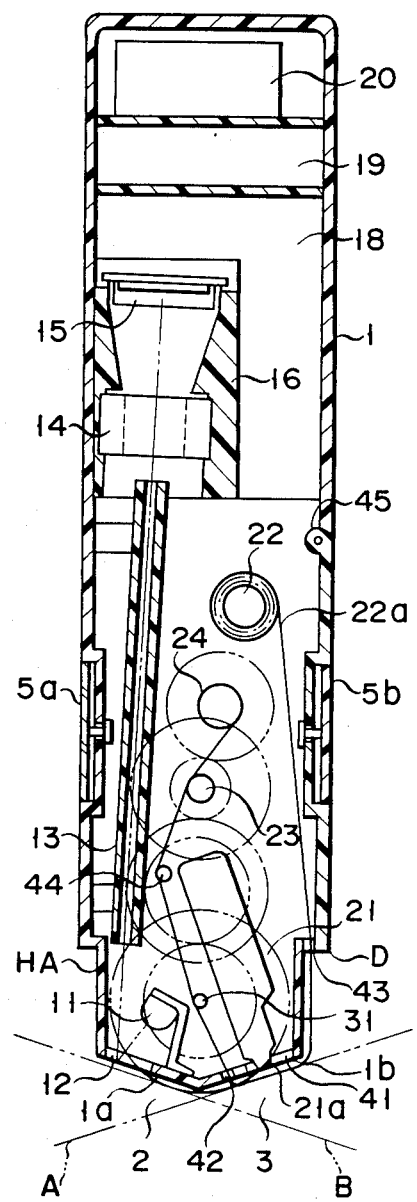
F I G. 2B

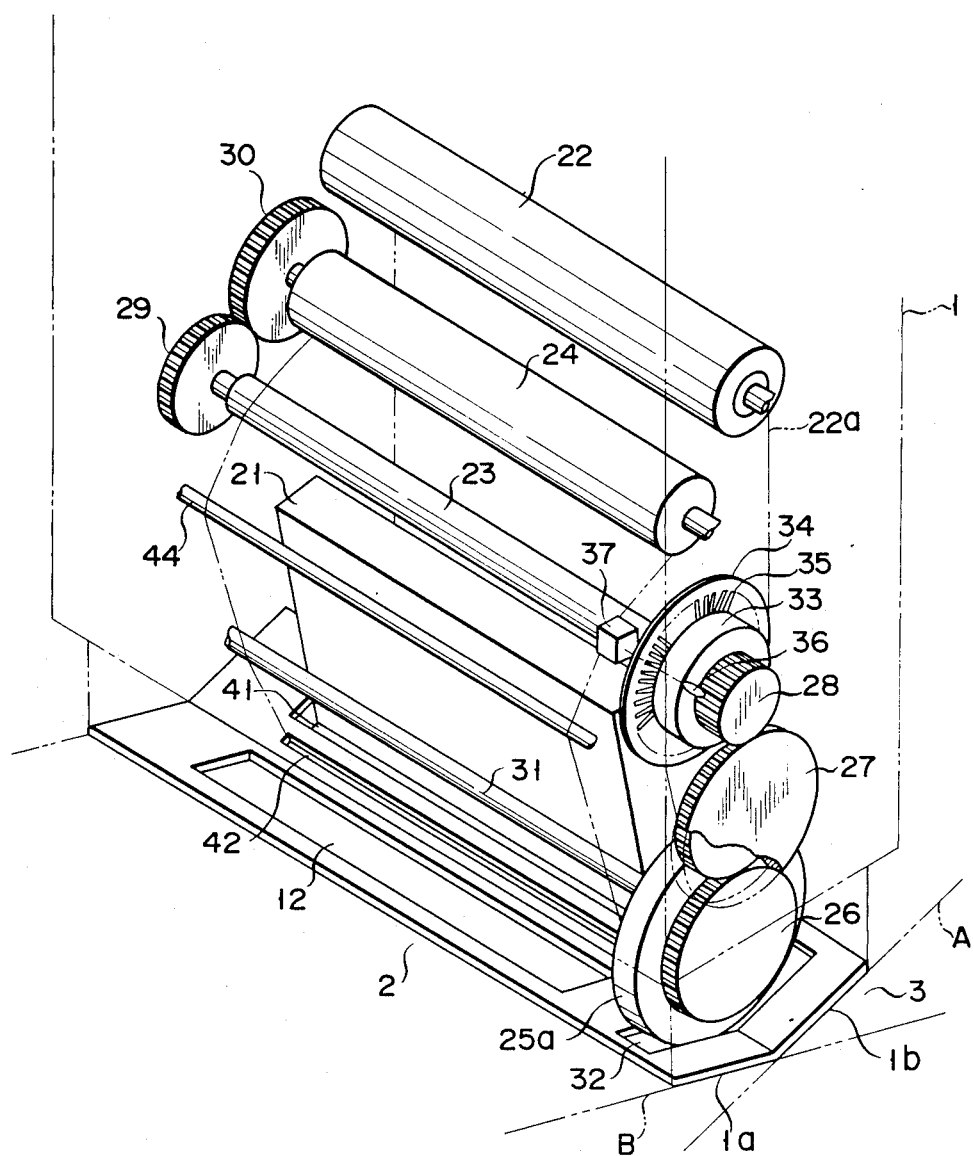
F I G. 3

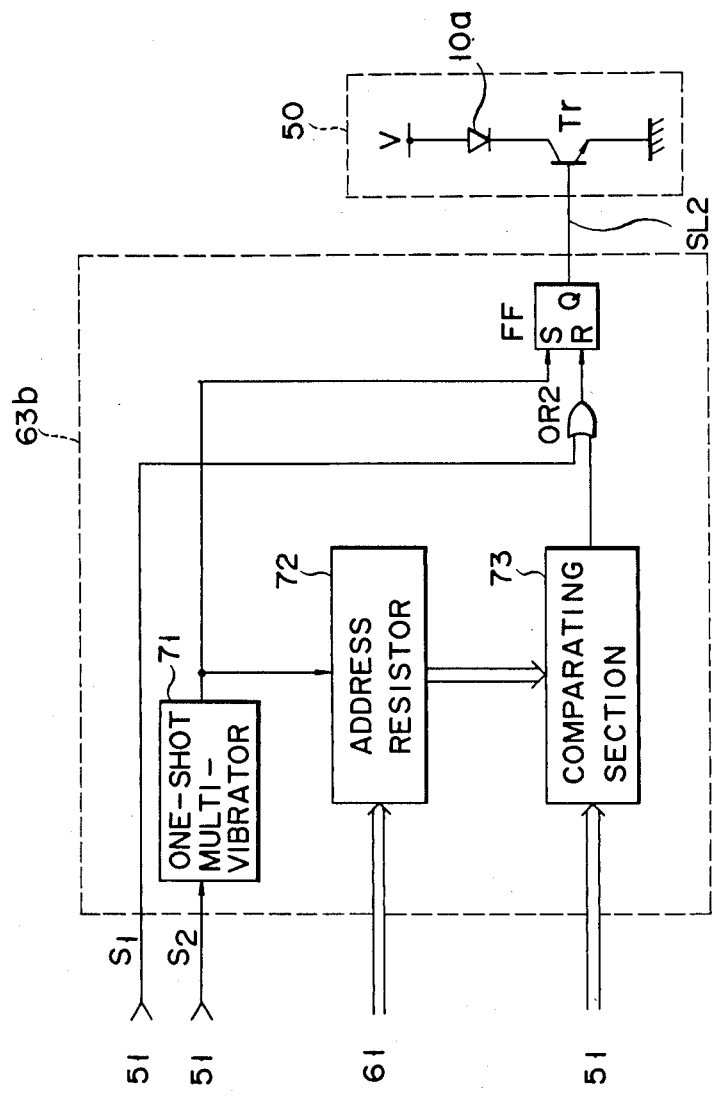
F I G. 6

MANUAL SWEEPING APPARATUS

BACKGROUND OF THE INVENTION

The present invention relates to a manual sweeping apparatus which can be manually passed over an original, thereby to read image information from the original and write the image information into a memory, and which can be manually moved across a piece of paper, thereby to read the image information from the memory and print the image information on the piece of paper.

Japanese Patent Disclosure No. 55-115773 (Applicant: Kabushiki Kaisha Ricoh; Inventors: Seiiti Nakamura, and Yojiro Sato) discloses a manual sweeping copier. The operational characteristics of this copier are as follows: (1) The copier is manually passed over an original, thus reading image information from the original. (2) The image information thus read is written into a memory. (3) The copier is then manually moved across a piece of paper, reads out the image information from the memory and prints the information on the piece of paper.

It is possible that the copier may be passed over an original even after the memory is filled to capacity with image information. It is also possible that the copier may be passed across a piece of paper even after all information is read out from the memory and printed on the paper. Therefore, the copier may fail to read all image data which the operator wishes to read when it is passed over the original after the memory is filled to capacity with image information, and may unnecessarily consume electric power, ink ribbon, paper and so on, when it is passed across a piece of paper even after all information has been read from the memory and printed on the paper.

SUMMARY OF THE INVENTION

It is accordingly the object of the present invention to provide a manual sweeping apparatus which has a memory and which is so designed that an operator can easily understand the condition of the memory, either before operating the apparatus, or while operating the apparatus.

In order to accomplish the above object, a manual sweeping apparatus according to this invention comprises a manually movable housing (1) having: input means (12, 14, 15, 56, 57) for producing image information signals while the housing is manually swept across a material having information; memory means (60) for storing the image information signals produced by said input means; position-detecting means (39) for detecting the position of the housing (1) being swept across the material, thereby to produce a signal every time the housing is swept over a predetermined distance, said signal representing the position of the housing with respect to the material; addressing means (51, 61, 62) for designating the addresses of said memory means, in sequence, in response to the signals produced by said position-detecting means; memory area-detecting means (63) for detecting an unwritten memory area of the memory means (60); and indicating means (50) for indicating the condition of the memory means in accordance with the results of detection obtained by the memory area-detecting means.

With the manual sweeping apparatus described above, it is possible for the operator to verify whether or not the memory means has an unwritten memory area, before sweeping the apparatus over an original in order to read image information from the original and write it into the memory means. Hence, no errors occur in reading the information due to an overflow of the memory means.

Further, according to the present invention, there is provided a manual sweeping apparatus further comprising: printing means provided within the housing, for printing the data stored in the memory means, on a printing medium while the housing is manually swept across the printing medium; print data-detecting means provided within the housing, for detecting whether or not data which is to be printed is stored in said memory means; and indicating means provided on the housing, for indicating the condition of the memory means in accordance with the results of detection obtained by the print data-detecting means.

With this manual sweeping apparatus, it is possible for the operator to know whether or not print data is stored in the memory means, while moving the apparatus across the printing medium. Therefore, the operator can stop moving the apparatus over the printing medium as soon as all data is read out from the memory means, and electric power, ink ribbon and so on need not be consumed unnecessarily.

BRIEF DESCRIPTION OF THE DRAWINGS

FIG. 2B is also a sectional view of the hand-held copier, taken along line II—II in FIG. 2A;

FIG. 3 illustrates the major components of the hand-held copier;

FIG. 6 is a block diagram illustrating the print data-detecting means, in greater detail.

DETAILED DESCRIPTION OF THE PREFERRED EMBODIMENT

A hand-held copier according to the present invention will now be described with reference to the accompanying drawings.

Figure 1:
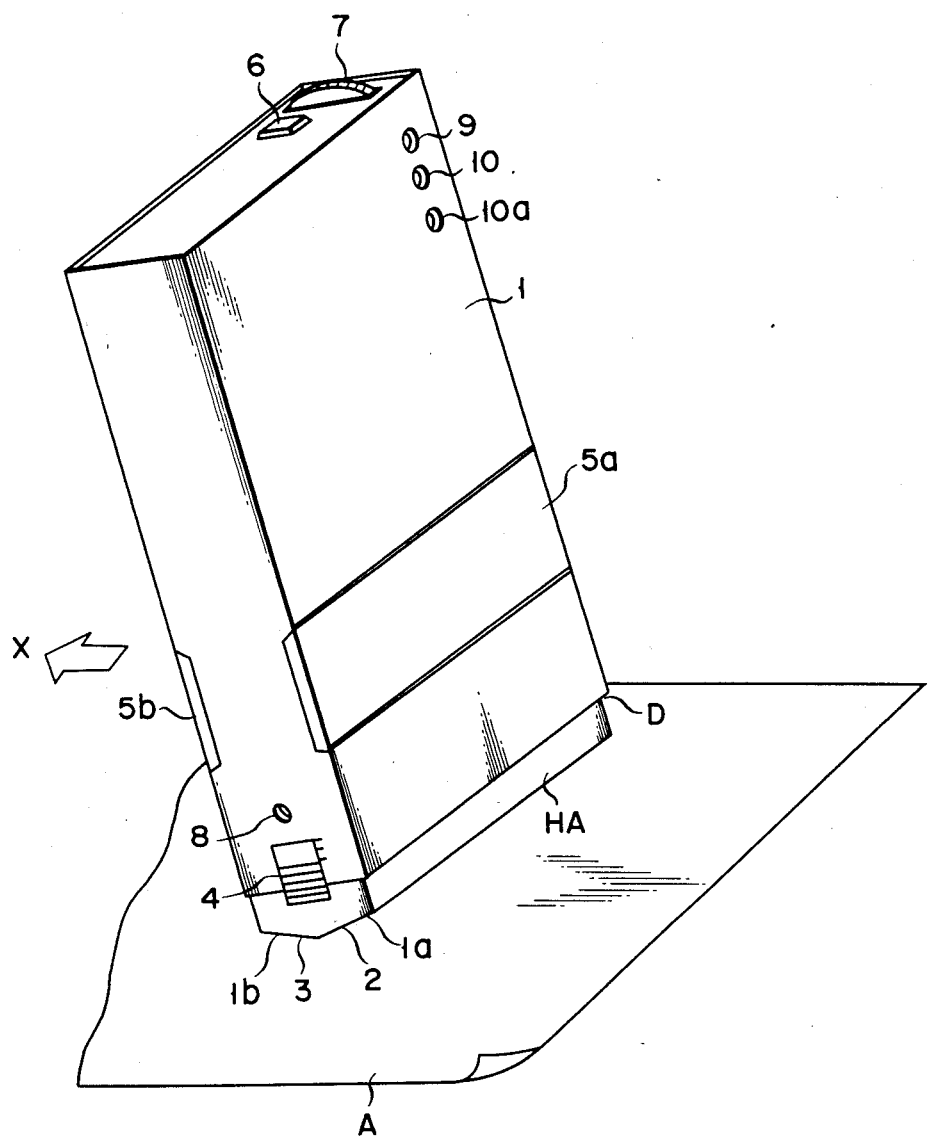
FIG. 1 is a perspective view of a hand-held copier embodying the present invention.

FIG. 1 is a perspective view showing the outer appearance of the portable hand-held copier. The copier can read and print an image having a maximum width of 40 mm, and can store data representing an image having a maximum width of 40 mm and a maximum length of 200 mm. It can read an image printed in a resolution of 8 dots/mm at most, and can print ink dots in a resolution of 8 dots/mm at most. As is shown in FIG. 1, the portable copier comprises housing 1, which is 70 mm wide, 30 mm thick, and 160 mm long.

Head section HA is attached to the distal end (or the lower end) of housing 1. Head section HA, which is designed to read an image from an original and also to print the image on paper A, is less wide and less thick than housing 1. Therefore, stepped portion D is formed between head section HA and housing 1. The distal end of head section HA consists of two long, narrow, inclined surfaces 1a and 1b. Inclined surfaces 1a and 1b are joined at their lower sides, thus forming a ridge. Reading section 2 is mounted on surface 1a, and printing section 3 is mounted on surface 1b. Power/read/print switch 4 is provided on one side of housing 1, and located at the lower end of this side. Operation switches 5a and 5b are provided on the opposing, broad surfaces of housing 1 (hereinafter referred to as the "front surface" and the "rear surface", which is not shown in FIG. 1), respectively. Both switches 5a and 5b are shaped like rectangular plates. Upper portions of the front and rear surfaces of housing 1, which are above operations switches 5a and 5b, can be held between a user's thumb and fingers, so that the user may move the portable copier back and forth. Power/read/print switch 4 is operated to turn the copier on or off, and to set the copier in a reading mode or a printing mode. More precisely, when switch 4 is operated to select either the reading mode or the printing mode, the portable copier is automatically turned on. Further, clear/reset key 6, and density control dial 7 are provided on the proximal (or upper) end of housing 1. Clear/reset key 6 is pushed to clear an image memory (later described in detail) when the portable copier is set in the reading mode, and to initialize the address of the image data memory when the copier is set in the printing mode. LED (Light-Emitting Diode) 8 is provided near switch 4. LEDs 9, 10 and 10a are provided on the front side of housing 1, and located near the proximal end of housing 1. LED 8 is a power-supply pilot lamp, LED 9 is a memory pilot lamp, and LED 10 is an alarm lamp and emits light when the copier is moved at a speed exceeding a predetermined value. Further, LED 10a is a print-data monitor lamp for emitting light until all data is read out from the image memory.

In order to read image data from an original by the portable copier, power/read/print switch 4 is moved to a "read" position, whereby the copier is turned on, and LED 8 emits light, thereby informing the user that the copier is now ready to use. The user holds the copier and sweeps it across the original in a direction opposite to arrow X shown in FIG. 1, while depressing both operation switches 5a and 5b and keeping reading section 2 in contact with the original. Reading section 2 reads the image data formed on the original. The data is then written into the image memory. When the user sweeps the copier across the original at a speed higher than the predetermined value, LED 10 emits light, thereby informing the user of this fact. Further, when the image memory filled to capacity with image data, LED 9 stops emitting light, thereby to inform the user of this fact.

In order to print the image data stored in the image memory, power/read/print switch 4 is moved to a "print" position. Then, the user again holds the copier and sweeps it across piece of ordinary paper A, in the direction of arrow X, while depressing both operation switches 5a and 5b and keeping printing section 3 in contact with paper A. As a result, the image data is read out from the image memory and is printed on paper A by means of printer section 3. When all image data to be printed is read out of the image memory, LED 10a stops emitting light, thus informing the user that all data has been read out.

Reading section 2 and printing section 3, both provided within housing 1, will now be described in greater detail, with reference to FIGS. 2A and 2B and FIG. 3.

Figure 2A:
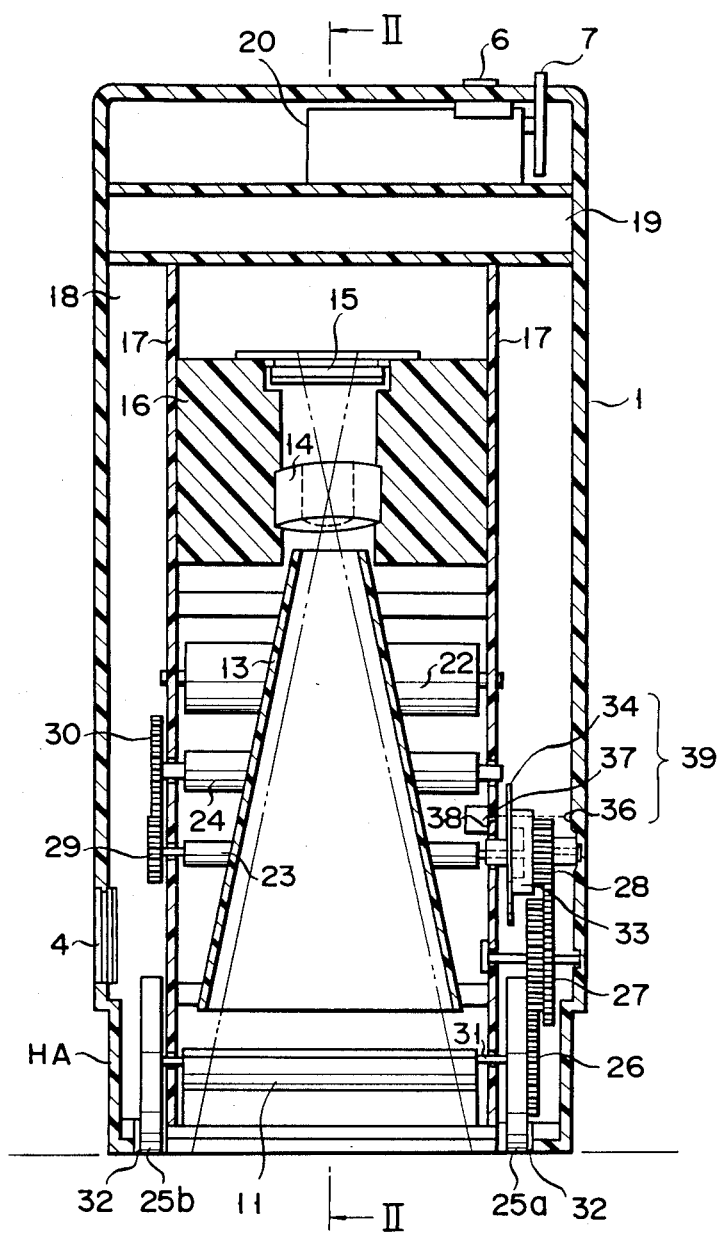
FIG. 2A is a sectional view showing the internal structure of the hand-held copier shown in FIG. 1.

As is shown in FIGS. 2A and 2B, reading section 2 includes light source 11 located close to inclined surface 1a, window 12 provided in the opening cut in inclined surface 1a, vertical light guide 13, lens 14 located at the top of guide 13, and line image sensor 15 provided above lens 14. Light source 11 includes an array of LEDs. The light emitted from light source 11 is applied to an original through window 12, and the light reflected from original B is guided by light guide 13 to lens 14 and then to image sensor 15. Image sensor 15 is, for example, a 1024-bit CCD (Charge-Coupled Device) line image sensor. Of 1024 bits, 320 bits are used to read an image having a maximum width of 40 mm, in a resolution of 8 dots/mm. Lens 14 and line image sensor 15 are held in specified positions by supporting member 16. This supporting member 16 is fastened to inner frame 17 provided within housing 1, and is spaced apart from the inner surfaces of housing 1 by a predetermined distance. Space 18 accommodating electronic parts (later described) is provided within housing 1, at one side of supporting member 16. Space 19 accommodating a battery is also provided within housing 1, and is located above supporting member 16. Line image sensor 15 is connected to circuit board (not shown) provided within space 18. Clear key 6, density control dial 7, and the like, are connected to circuit board 20.

Within inner frame 17, there are provided printer head (thermal head) 21, roll 22 of ink ribbon, roller 23 for feeding ribbon 22a at a constant speed, and ribbon take-up roller 24. Rubber rollers 25a and 25b, and gears 26 to 30 are provided within the space between inner frame 17 and the inner surfaces of housing 1. Rubber rollers 25a and 25b are rotatably mounted on shaft 31 extending horizontally across inner frame 17 and protruding at both ends from inner frame 17. They are positioned such that parts of their peripheries protrude outside through slits 32 cut in the end portions of inclined surfaces 1a and 1b. Gear 26 is coaxially secured to rubber roller 25a. This gear 26, which has a smaller diameter than rubber roller 25a, is coupled by intermediate gear 27 to gear 28. Gear 28 is coupled by clutch 33 to the shaft of ribbon-feeding roller 23. Clutch 33, which is of a one-way type, transmits the rotation of gear 28 to ribbon-feeding roller 23 only when the user sweeps the portable copier across paper A to print an image thereon.

Encoder disk 34 is fastened to the input-end of clutch 33. Encoder 34 can rotate, independently of the operation of one-way clutch 33, when gear 28 rotates. As is shown in FIG. 3, encoder disk 34 has a number of radial slits 35 located at regular intervals in the circumferential direction of disk 34. LED 36 is provided at one side of disk 34, and photosensor 37 is provided at the other end of disk 34. As is illustrated in FIG. 2A, LED 36 is secured to the inner surface of housing 1, and photosensor 37 is fastened to the inner surface of inner frame 17. Hole 38 is cut in frame 17, positioned coaxially with photosensor 37. Hence, the light emitted from LED 36 can be applied to photosensor 37, first through slits 35 of encoder disk 34 and then through hole 38. Encoder disk 34, LED 36, and photosensor 37 constitute encoder 39.

As is shown in FIG. 3, printing window 41 and ribbon-guiding window 42, both shaped like long slits, are cut in inclined surface 1b and extend parallel to each other. Ribbon-guiding window 42 is located closer to inclined surface 1b than printing window 41. Thermal printer head 21 has heating section 21a, which is inserted in printing window 41. Heating section 21a slightly protrudes from inclined surface 1b. As is shown in FIG. 2B, slit 43 is cut in stepped portion D close to that side of housing 1 on which operation key 5b is provided. Thermal-transfer ink ribbon 22a taken out of roll 22 is led out of housing 1 through slit 43, and then guided into housing 1 through ribbon-guiding window 42 after passing by heating section 21a of thermal printer head 21. Within housing 1, ink ribbon 22a is guided by shaft 31, ink ribbon guide 44 and ribbon-feeding roller 23, and is finally taken up around ribbon take-up roller 24.

As is illustrated in FIG. 2B, the lower half of that side of housing 1 on which operation key 5b is provided can be opened when pivoted around hinge 45. When the lower half of this side is open, used ribbon roll 22 can be replaced with a new one, and the interior of housing 1 can be inspected for maintenance.

Figure 4:
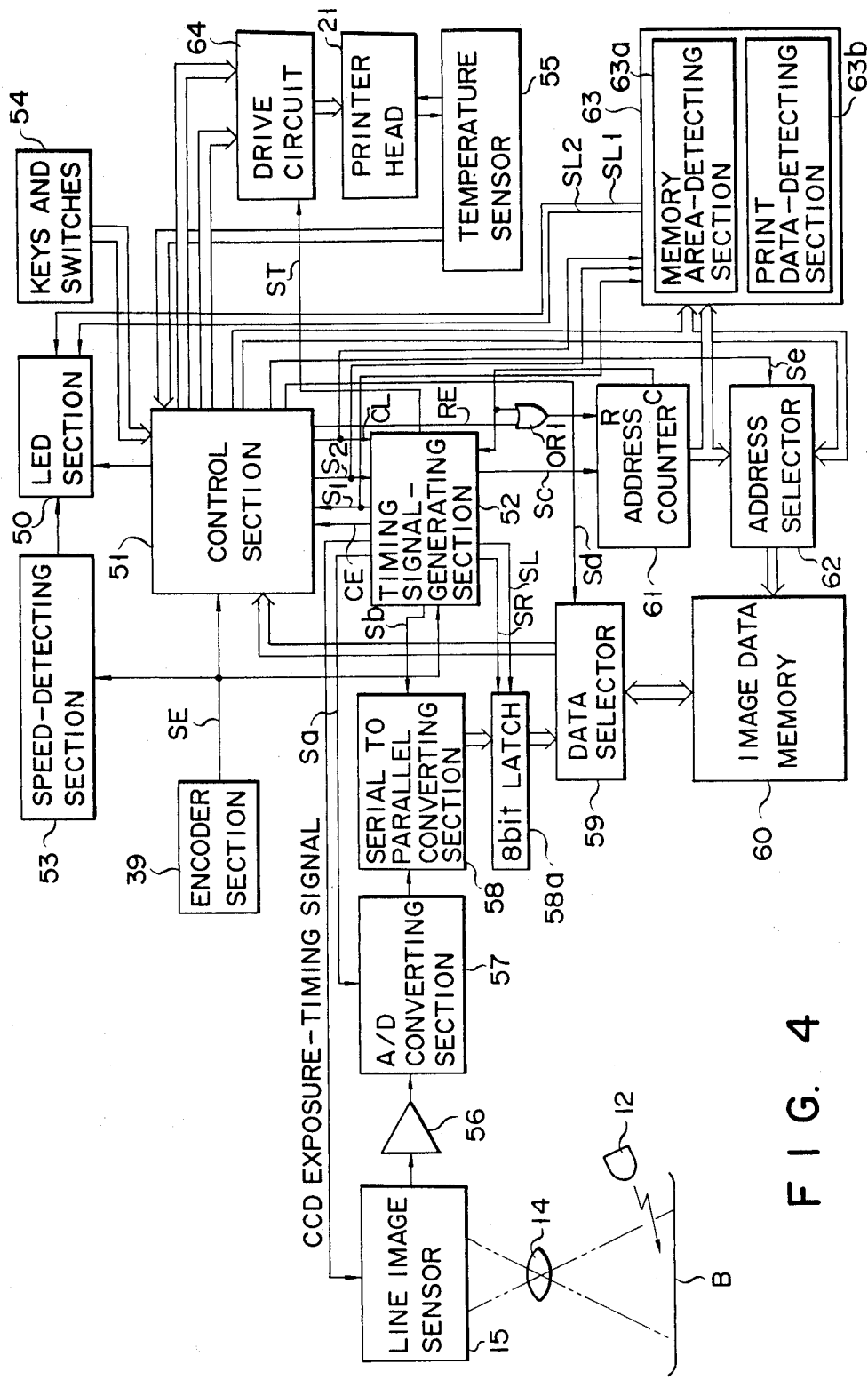
FIG. 4 is a block diagram showing the electronic circuit provided within the hand-held copier.

The electric circuitry mounted on circuit board 20 provided within space 18 will now be explained with reference to FIG. 4.

As has been described, encoder section 39 includes encoder disk 34, LED 36 and photosensor 37. When the user sweeps the portable copier across original B while keeping the copier in contact with original B, rubber rollers 25a and 25b rotate, thus rotating encoder disk 34. As disk 34 rotates, the light emitted from LED 36 is intermittently applied to photosensor 37 through radial slits 35 of disk 34. Every time photosensor 37 receives the light, it produces a pulse. Hence, encoder section 39 generates a pulse signal SE consisting of such pulses. Signal SE therefore represents the distance over which the copier has been moved across original B. Signal SE is supplied from encoder section 39 to control section 51, timing signal-generating section 52, and speed-detecting section 53.

Signals are supplied to control section 51, which are generated when keys and switches, such a power-/read/print switch 4, operation keys 5a and 5b, clear key 6, and density control dial 7, are operated. The signal generated by temperature sensor 55, which detects the temperature of thermal print head 21, is also supplied to control section 51. Section 51 has a power source voltage detector (not shown). Control section 51 also controls other components of the copier. Further, section 51 supplies an operation command S1 to timing signal-generating section 52 when the copier is set in the reading mode, and supplies an operation command S2 to section 52 when the copier is set in the printing mode.

Timing signal-generating section 52 generates a timing signal in response to operation command S1 given by control section 51. This signal represents the timing at which the CCD elements of line image sensor 15 are exposed to light, one after another. Section 52 generates other signals in synchronism with the pulses of signal SE supplied from encoder section 39, such read-timing signal Sa, serial-to-parallel conversion signal Sb, and clock pulses Sc. Further, timing signal-generating section 52 generates a print-timing signal in response to operation command S2 supplied from control section 51.

The timing signal output by timing signal-generating section 52, i.e., the CCD exposure-timing signal, is supplied to line image sensor 15. Read-timing signal Sa is supplied to A/D converting section 57. Serial-to-parallel converting signal Sb is supplied to serial-to-parallel converting section 58. Clock pulses Sc are input to address counter 61. Address counter 61 also receives reset signals. Line image sensor 15 receives the light reflected from original B, in synchronism with the CCD exposure-timing signal, and produces output signals. The output signal of image sensor 51 is amplified by amplifier 56 and then input to A/D converting section 57. A/D converting section 57 converts this signal into a binary signal in synchronism with read-timing signal Sa. The binary signal is supplied to serial-to-parallel converting section 58. Section 58 converts the input signal into, for instance, an 8-bit signal in synchronism with serial-to-parallel coverting signal Sb. This 8-bit data signal is input via 8-bit latch 58a and data selector 59 to image data memory 60. Data selector 59 is connected to control section 51 by a data line. Latch pulses SL are supplied to 8-bit latch 58a from timing signal-generating section 52. Selection signal Sd is supplied through the data line from control section 51 to data selector 59. In accordance with selection signal Sd, data selector 59 selects 8-bit latch 58a or control section 51.

Any desired write address of image data memory 60, which consists of a row address and a column address, is designated by the output of address counter 61 and selected by address selector 62. Any desired read address of image data memory 60 is supplied from control section 51 through address selector 62. In accordance with selection signal Se, address selector 62 selects the output address of address counter 61 when the copier is set in the reading mode, and selects the output address of control section 51 when the copier is set in the printing mode. In either case, one of the addresses of image data memory 60 is designated.

The write address designated by the output of address counter 61 is supplied to address condition-detecting section 63. Operation commands S1 and S2, a clear signal, and an address signal are input to this section 63. Section 63 comprises memory area-detecting section 63a and print data-detecting section 63b. Memory area-detecting section 63a detects the size of the unwritten memory area of image data memory 60 from the write address when the portable copier is set in the reading mode. Section 63a then supplies first LED drive signal SL1 to LED section 50, thereby turning LED 9 on or off. Print data-detecting section 63b detects whether all image data has been read from image data memory 60 or not, and generates second LED drive signal SL2 to LED section 50, thereby turning LED 10a on or off. Sections 63a and 63b will later be described in detail.

Control section 51 outputs clear signal CL. This signal CL is supplied to address condition-detecting section 63, and also to timing signal-generating section 52, and is used to clear the image data stored in image data memory 60. At the same time that control section 51 outputs clear signal CL, section 51 also supplies reset signal RE to address counter 61 through OR gate OR1. Upon receipt of clear signal CL, timing signal-generating section 52 outputs clock pulses at frequency (1 MHz) which is eight times higher than the frequency at which clock pulses are generated in writing data. These clock pulses are supplied to address counter 61. Further, timing signal-generating section 52 outputs reset signal SR to 8-bit latch 58a. Therefore, the data stored in image data memory 60 is cleared at a speed eight times higher than that in which the data has been written into memory 60. When address counter 61 outputs a carry signal, the memory-clearing operation is stopped. Then, section 52 outputs memory-clearing end signal CE to control section 51.

After the image data has been read from original B and subsequently written into image data memory 60, the portable copier can be switched to the printing mode. When the copier is set in the printing mode, control section 52 outputs operation command S2. As the user sweeps the copier across paper A, control section 51 receives the output signals of encoder 39, which represent the distance the copier has been moved across paper A. Section 51, therefore, causes data selector 59 to gradually read the image data from image data memory 60. Then, control section 51 determines the optimum time or supplying power to thermal printer head 21, from the data output by temperature sensor 55 and representing the temperature of printer head 21, the data output by the power-supply voltage detector and showing the power-supply voltage, and the data output by density control dial 7 and showing the density selected by turning dial 7. The data representative of this optimum time is supplied, as print data, to printer head drive circuit 64. In accordance with the printing-time data, circuit 64 drives thermal printer head 21 in synchronism with the timing signal ST supplied from timing signal-generating section 52.

Address condition-detecting section 63 will now be described in detail, with reference to FIGS. 5 and 6.

Figure 5:
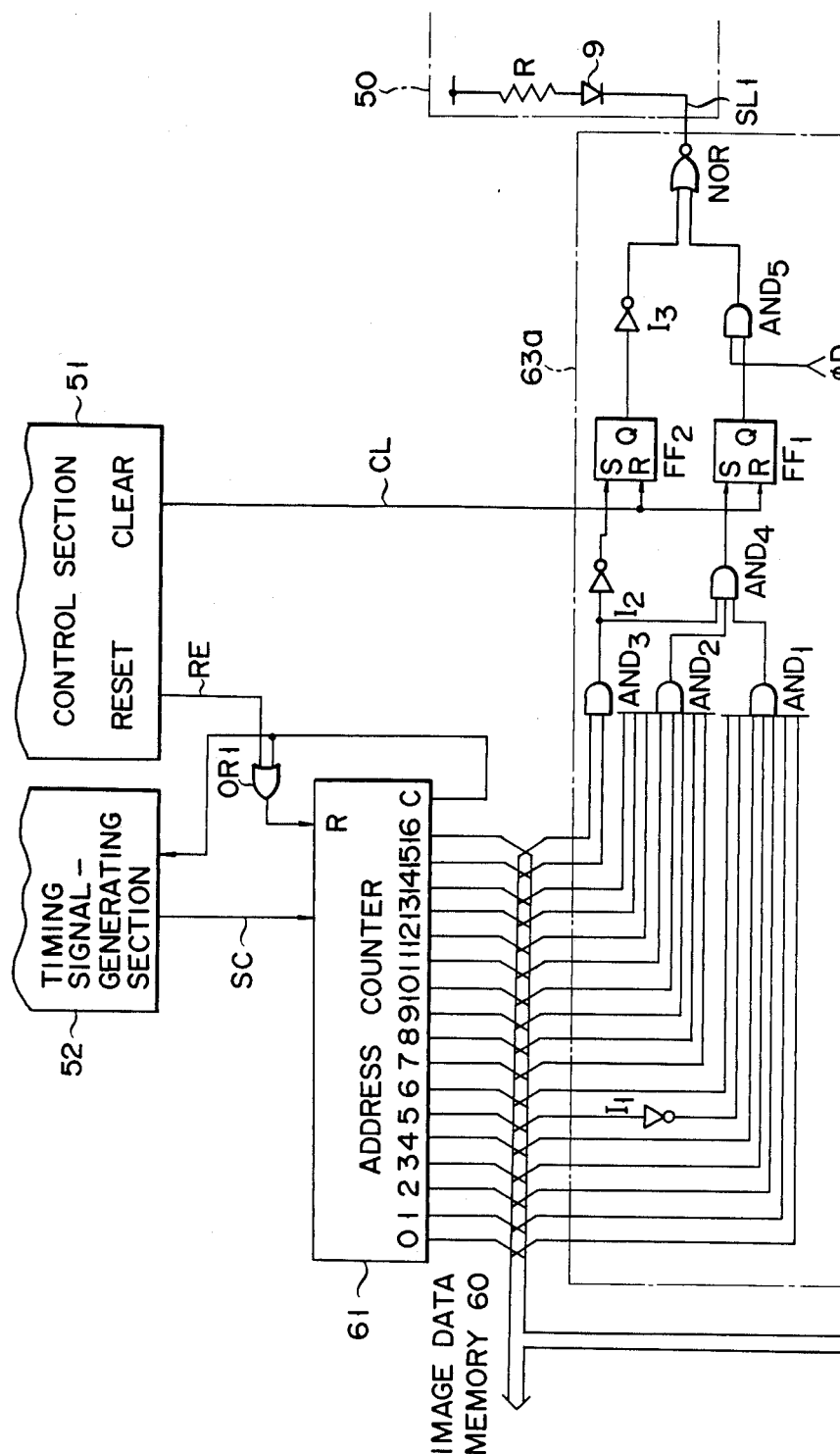
FIG. 5 is a block diagram showing the memory area-detecting section and the print data-detecting section, which form the address condition-detecting section shown in FIG. 4.

FIG. 5 shows memory area-detecting section 63a and the peripheral circuits thereof. As is shown in this figure, memory area-detecting section 63a has three AND gates AND1, AND2, and AND3. Bit lines 0 to 6 of address counter 61 are connected to gate AND1. Bit lines 7 to 14 of address counter 61 are coupled to gate AND2. Bit lines 15 and 16 of address counter 61 are coupled to gate AND3. Of these bit lines, bit line 5 is connected to AND gate AND1 by inverter I1. The output signals of input AND gates AND1, AND2, and AND3 are supplied to three-input AND gate AND4. The output of AND gate AND4 is input to set terminal S of RS flip-flop FF1. The output signal of AND gate AND3 is input to set terminal S of RS flip-flop FF2 via inverter I2. The output signal of flip-flop FF1 is input to AND gate AND5. The output signal of flip-flop FF2 is input to inverter I3. The output signal of AND gate AND5 and the output signal of inverter I3 are supplied to two-input NOR gate NOR. The output signal of NOR gate NOR is output to LED 9 of LED section 50. Clear signal CL output from control section 51 is input to reset terminals R of both SR flip-flop FF1 and FF2.

FIG. 6 shows print data-detecting section 63b in detail. As is shown in this figure, operation command S2 (i.e., print command) is input via one-shot multi-vibrator 71 to address register 72 and also to set terminal S of RS flip-flop FF. Address register 72 latches the last write address of image data memory 60, which has been supplied from address counter 61. The output data of address register 72 is supplied to comparing section 73. Section 73 compares the last write address with the designated write address supplied from control section 51. When the compared write addresses are identical, comparing section 73 outputs a coincidence signal. The coincidence signal is supplied to reset terminal R of flip-flop FF through OR gate OR2. This OR gate OR2 also receives operation command S1 (i.e., read command) supplied from control section 51. Output terminal Q of flip-flop FF is connected to the base of transistor Tr provided for driving LED 10a of LED section 50.

Figure 7:
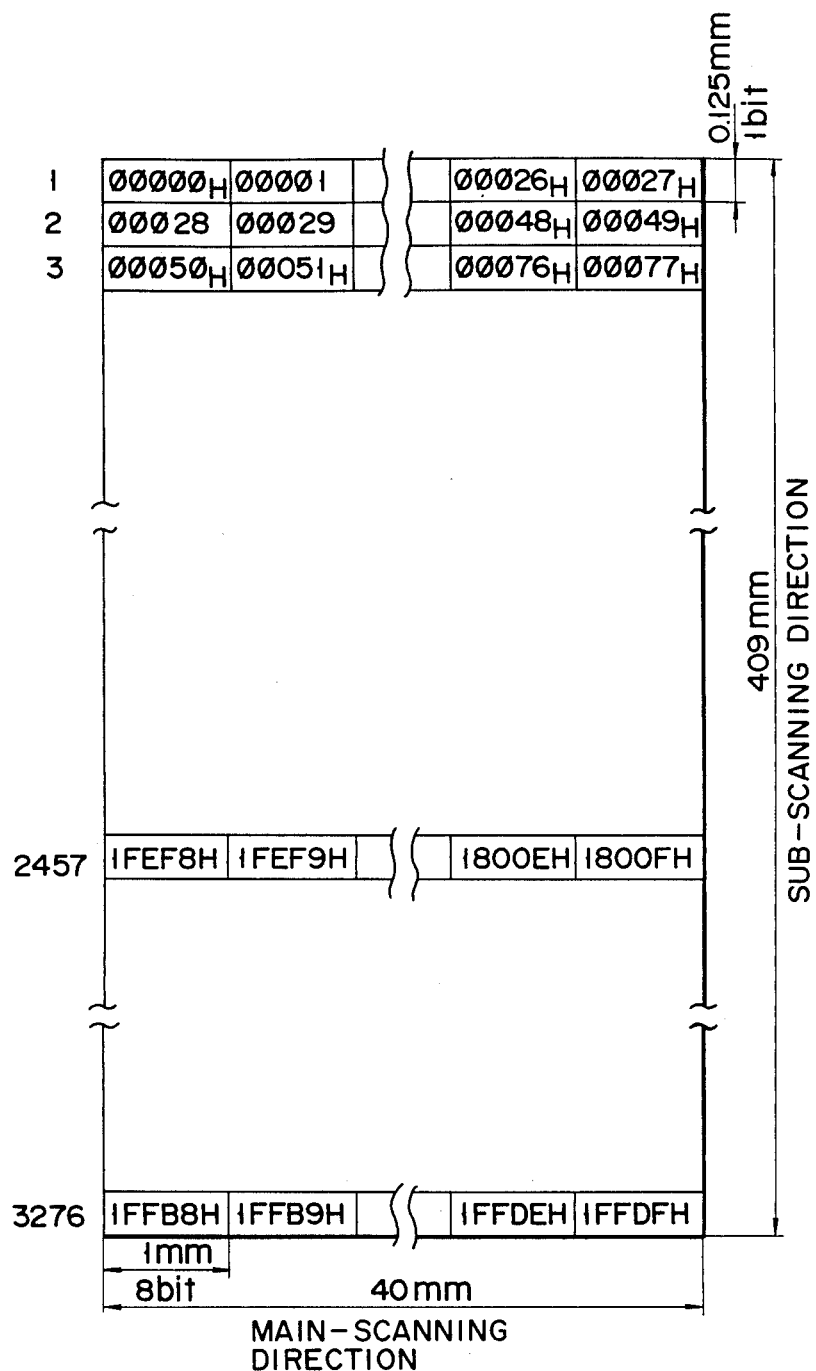
FIG. 7 is a diagram representing the memory map of the image data memory shown in FIG. 4.

Image data memory 60 is a bit map memory having the memory map shown in FIG. 7. As may be understood from FIG. 7, image data memory 60 can store data of 3276 lines at addresses "00000(H)" to "1FFDF(H)".

It will be explained how the portable copier is operated to read the image data, such as characters and an image, from original.

First, the user moves power/read/print switch 4 from a "power off" position to the "read" position. Therefore, power is supplied to the electronic circuit of the copier. Control section 51 turns on LED 8 of LED section 50, thereby informing the user that the electronic circuit has been turned on. At the same time, control section 51 gives operation command S1 to timing signal-generating section 52. Thereafter, the user sweeps the portable copier across original B in the direction opposite to arrow X (FIG. 1), as is shown in FIG. 2B, while keeping reading section 2 in contact with original B and depressing both operation switches 5a and 5b. The light emitted from light source 11 is applied to original B through window 12 cut in inclined surface 1a. The light is reflected from original B, and guided by light guide 13 (FIG. 2B). The light is finally applied via lens 14 to line image sensor 15.

As the portable copier is swept across original B, rubber rollers 25a and 25b, both contacting original B, rotate. Gears 26, 27, and 28 are, therefore, rotated. As a result, encoder disk 34 coupled to gear 28 rotates at the speed in accordance with to the speed at which the user is sweeping the copier across original B. As encoder disk 34 rotates in this manner, the light emitted from LED 36 is intermittently applied to photosensor 37 through the radial slits 35 of encoder disk 34. Photosensor 37 produces a pulse every time it receives the light. Therefore, it generates a pulse signal SE consisting of such pulses. The pulse signal SE, i.e., the output signal of encoder 39 (FIG. 4) which represents the distance the copier has been moved across original B, is supplied to control section 51, timing signal-generating section 52, and speed-detecting section 53.

Meanwhile, when operation command S1 is input to timing signal-generating section 52, section 52 starts supplying CCD-exposure timing pulses at regular intervals to line image sensor 15. Further, section 52 generates read-timing signal Sa and serial-to-parallel converting signal Sb in accordance with the output signal SE of encoder 39 which shows the distance the copier has been moved. Read-timing signal Sa is input to A/D converting section 57, and serial-to-parallel converting signal Sb is input to serial-to-parallel converting section 58. Timing signal-generating section 52 generates clock pulses Sc and latch pulses SL in synchronism with serial-to-parallel converting signal Sb. Clock pulses Sc are supplied to address counter 61, and latch pulses SL are input to 8-bit latch 58a.

Line image sensor 15 produces image signals from the light reflected from original B, in synchronism with CCD-exposure timing pulses output from timing signal-generating section 52. The image signal is amplified by amplifier 56 and then supplied to A/D converting section 57. A/D converting section 57 converts the image signal to a serial digital signal in synchronism with read-timing signal Sa. The digital signal is input to serial-to-parallel converting section 58. Section 58 converts the digital signal to parallel image data in synchronism with serial-to-parallel converting signal Sb. The image data thus provided, or items of 8-bit parallel data, is input to data selector 59 through 8-bit latch 58a. Data selector 59 selects and outputs the output data of serial-to-parallel converting section 58 in accordance with select signal Sd supplied from control section 51, since the portable copier is set in the reading mode. Hence, data selector 59 selects the output data of serial-to-parallel converting section 58, i.e., the 8-bit data items output from 8-bit latch 58a. The image data output from data selector 59 is supplied to image data memory 60. All addresses of image data memory 60 are output from by address selector 62. Address selector 62 selects the output data from address counter 61 in accordance with select signal Se supplied from control section 51, and outputs this data. As a result, that address of memory 60 which corresponds to the output data of address counter 61 is designated. The count value of address counter 61, which defines the column address, is incremented by "+1" every time a clock pulse Sc is input to counter 61 from timing signal-generating section 52. Timing signal-generating section 52 stops timing signals when image data of one line is written into image data memory 60. It continues to produce timing signals until it receives a pulse from encoder 39. The sequence of the operations described above is repeated, whereby the image data read from original B is written into image data memory 60, line by line.

The count value of address counter 61 is supplied to memory area-detecting section 63a (FIG. 5). While the count value of this counter 61 is increasing from "00000(H)" to "18000(H)", that is, while the first 2457 lines of image data are being written into image data memory 60, flip-flop FF2 is set. Therefore, the output signal SL1 of memory area-detecting section 63a remains at a high level until the first 2457 lines of image data are written into memory 60. Thus, LED 9 of LED section 50 is continuously on, informing the user that image data memory 60 can store much more data. While the count value of address counter 61 is increasing from "18001(H)" to "1FFDE(H)", or while the next 819 lines (i.e., 2458th line to 3276th line) of image data are being written into memory 60, flip-flop FF1 is set. Therefore, clock signals having a cycle of $\phi_D$ are input to AND gate AND5, and gate AND5 also outputs clock signals. As a result, memory area-detecting section 63a alternately outputs a high-level signal and a low-level signal. LED 9 of LED section 50 thereby flickers, thus informing the user that image data memory 60 is about to become full. When the least address of memory 60, i.e., "1FFDF(H)", is designated, neither flip-flop FF1 nor flip-flop FF2 is set. As a result, the output signal SL1 of memory area-detecting section 63a falls to a low level. LED 9 of LED section 50 is therefore turned off, thereby informing the user that no more image data can be written into memory 60.

With the portable copier, it is therefore possible for the user to know how much data can be further written into image data memory 60, merely by watching LED 9. The user can avoid the possibility that memory 60 will become full before the whole image is read from original B.

It will now be explained how the portable copier prints the image data read from original B, on a piece of paper A.

First, power/read/print switch 4 is moved to the "print" position, thereby setting the copier in the printing mode. Control section 51 produces select signal Sd, thus controlling data selector 59 such that selector 59 outputs data to control section 51. At the same time, control section 51 generates select signal Se, thereby controlling address selector 62 such that selector 62 selects and outputs the data supplied from control section 51. Then, the user sweeps the copier across paper A in the direction of arrow X (FIG. 1), while keeping printing section 3 in contact with paper A and depressing both operation switches 5a and 5b. As the copier is moved in this way, rubber rollers 25a and 25b rotate, thereby rotating gears 26, 27 and 28. Encoder disk 34, which is fastened to gear 28, therefore rotates. The light emitted from LED 36 is intermittently applied to photosensor 37 through radial slits 35 of disk 34. As a result, photosensor 37 outputs pulses, which form signal SE representing the distance the copier has been moved across paper A.

The rotation of gear 28 is transmitted by one-way clutch 33 to ribbon-feeding roller 23, and further to ribbon take-up roller 24 by gears 29 and 30. As rollers 23 and 24 rotate, ink ribbon 22a is fed from roll 22 and guided through slit 43. Ribbon 22a then passes by heating section 21a of thermal print head 21. It is further guided through ribbon-guiding window 42, and then guided by ribbon-feeding roller 23. Finally, ribbon 22a is taken up around ribbon take-up roller 24. Ribbon-feeding roller 23 rotates, thereby feeding ribbon 22a at the same speed as the handy copier is being swept across paper A. Hence, no relative movement occurs between ribbon 22a and paper A.

Output signal SE of photosensor 37 is supplied to control section 51. This signal SE is also supplied to timing signal-generating section 52 and speed-detecting section 53. Signal SE is the output of encoder 39, which represents the distance the copier has been moved across paper A. In accordance with signal SE, timing signal-generating section 52 outputs a one-line printing command to control section 51, and also outputs print-timing signals to printer head drive circuit 64. Further, in accordance with signal SE output from encoder 39, section 51 designates the line addresses and digit addresses of image data memory 60, in sequence. The image data is thereby read out from memory 60 via data selector 59. The image data, thus read out, is supplied to printer head drive circuit 59, line by line.

Meanwhile, control section 51 calculates the time for supplying power to thermal print head 21, in response to the temperature of print head 21 detected by temperature sensor 55, the voltage represented by the output signal of the power-supply voltage detector, and the density selected by rotating density control dial 7. Control section 51 supplies printer head drive circuit 64 with the data showing the power-supplying time and control data including the image data read from image data memory 60. Circuit 6d drives thermal print head 21 in accordance with the control data supplied from control section 51 and also in accordance with timing signal ST supplied from timing signal-generating section 52. Thermal print head 21 therefore prints the image data on paper A by using ink ribbon 22a. As the portable copier is moved across paper A during the printing operation, the unused portion of ribbon 22a is fed from roll 22, and the used portions of ribbon 22a is taken up around ribbon take-up roller 24. In this way, the image data stored in memory 60 is printed on paper A as the user sweeps the copier across paper A.

In order to print the image data on paper A, control section 51 supplies operation command S2 to print data-detecting section 63b. Upon receipt of command S2, one-shot multivibrator 71 supplies a pulse signal to set terminal S of flip-flop FF. The output signal of flip-flop FF therefore rises to the high level. This signal at the high level turns on transistor Tr of LED section 50, whereby LED 10a is lighted. Hence, LED 10a is turned on at the start of printing the image data.

Meanwhile, the output pulse signal of one-shot multivibrator 71 is also supplied to address register 72. Upon receipt of this pulse signal, address register 72 supplies comparing section 73 with the data representative of the last write address which has been supplied to register 72 from address counter 61. Comparing section 73 compares the last write address with the designated read address supplied from control section 51. (The read address is incremented by "+1" every time one item of print data is read out from image data memory 60). The output signal of comparing section 73 remains at the low level until the write address is incremented to become identical to the last write address. When the read address becomes identical to the last write address, the output signal of comparing section 73 rises to the high level. This signal at the high level is supplied via OR gate OR2 to reset terminal R of flip-flop FF, thereby resetting flip-flop FF. As a result, transistor Tr of LED section 50 is turned on, whereby LED 10a is turned off. In other words, LED 10a is turned off when all data of the image to be printed is read out from memory 60, and the read address designated by control section 51 becomes identical with the last write address stored in address register 72. Noticing that LED 10a is turned off, the user can understand that no more data of the image to be printed is left in image data memory 60.

The user can, therefore, know whether or not image data memory 60 contains further print data, merely by taking a look at LED 10a while the user is sweeping the portable copier across paper A, thus printing the image on paper A. It can thus be prevented that the user unnecessarily sweeps the copier even after all image data has been read out from memory 60 and subsequently printed on paper A.

After the image has been printed on paper A, the image data stored in memory 60 can be erased. To erase the image data, the user moves power/read/print switch 4 to the "read" position, and then pushes clear/reset key 6 provided on housing 1. Then, control section 51 outputs operation command S1 to timing signal-generating section 52, and outputs clear signal CL to memory area-detecting section 63a. Further, control section 51 outputs reset signal RE via the OR gate OR1 to address counter 61. In response to clear signal CL supplied from control section 51, timing signal-generating section 52 outputs reset signal SR to 8-bit latch 58a, and outputs clock pulses Sc to address counter 61. Clock pulses Sc are generated at the frequency of 1 MHz, which is eight times higher than that of the pulse signal generated as the copier is swept over original B to read the image therefrom. Address counter 61 thereby designates all addresses of image data memory 60 at a high speed. Every time the count value of counter 61 increases by one, data "00000000" is read from 8-bit latch 58a (which is reset), and written into one memory location of memory 60 via data selector 59. Hence, all image data stored in memory 60 is erased. In the meantime, clear signal CL output from control section 51 is supplied to reset terminals R of flip-flops FF1 and FF2 of memory area-detecting section 63a. The output signals of both flip-flops FF1 and FF2 therefore rise to the high level. Consequently, LED 9 of LED section 50 is lighted, thus informing the user that all image data stored in image data memory 60 has been erased.

What is claimed is:

1. A manual sweeping apparatus including a manually manipulatable housing, said housing comprising:
   input means for producing image information signals while said housing is manually swept across a material having thereon image information to be copied, said image information signals corresponding to said image to be copied;
   memory means for storing the image information signals derived from said input means;
   printing means for printing image information on a printing medium while said housing is manually swept across said printing medium;
   position detecting means for detecting the relative position of said housing while said housing is being swept across either of said material and said printing medium, and for producing a position signal every time said housing is swept over a predetermined distance, said position signal representing the position of said housing with respect to either of said material and said printing medium;
   control means for controlling said printing means in synchronism with the position signal produced by said position-detecting means, for causing said printing means to print image information on said printing medium, the image information printed on said printing medium corresponding to said image information on said material to be copied;
   addressing means for addressing an area of said memory means in response to a position signal produced by said position-detecting means, when an image information signal from said input means is written in an addressed area of said memory means, and for addressing an area of said memory means before the position signal produced by said position-detecting means, when said image information signal is read out from said memory means and supplied to said printing means, so that image information is printed on said printing medium in correspondence with the signal produced by said position-detecting means;
   first detecting means for detecting whether an address value which is addressed by said addressing means, when an image information signal from said input means is written in the addressed area of said memory means, coincides with a predetermined address value;
   address storage means for storing the address value which is finally addressed by said addressing means while an image information signal from said input means is written in the addressed area of said memory means;
   second detecting means for detecting whether the address value which is addressed by said addressing means, when said image information signal is read out from said memory means and supplied to said printing means, coincides with the address value stored in said address storage means; and
   informing means for informing a user of the condition of said memory means in accordance with the results obtained by said first detecting means and said second detecting means.

2. The manual sweeping apparatus of claim 1, wherein said first detecting means includes means for detecting whether or not the address value output from said addressing means coincides with a last address value of said memory means.

3. The manual sweeping apparatus of claim 2, wherein said first detecting means includes means for detecting whether or not the address value output from said addressing means coincides with a specified address value existing between a first and last address value of said memory means.

5. The manual sweeping apparatus of claim 3, wherein said informing means includes a light-emitting diode; and drive means for driving said light-emitting diode in accordance with the results of detection obtained by said first detecting means.

5. The manual sweeping apparatus of claim 3, wherein said informing means includes:
display means;
means for turning on said display means continuously until said first detecting means detects that an address value output from said addressing means coincides with a specified address value existing between first and last address values of said memory means;
means for repeatedly turning on and off said display means after said first detecting means detects that an address value output from said addressing means coincides with a specified address value existing between a first and last address value of said memory means; and
means for turning off said display means at a time when said first detecting means detects that an address value output from said addressing means coincides with a last address of said memory means.

* * * * *